(12) United States Patent
Garg et al.

(10) Patent No.: US 12,530,207 B2
(45) Date of Patent: Jan. 20, 2026

(54) SYSTEM AND METHOD FOR AUTOMATICALLY MONITORING APPLICATION PERFORMANCE

(71) Applicant: JPMorgan Chase Bank, N.A., New York, NY (US)

(72) Inventors: Hemant Garg, Sunnyvale, CA (US); Kamalpreet Singh, Allen, TX (US); Michael Alexeev, Dublin, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 218 days.

(21) Appl. No.: 18/388,059

(22) Filed: Nov. 8, 2023

(65) Prior Publication Data

US 2024/0168775 A1    May 23, 2024

Related U.S. Application Data

(60) Provisional application No. 63/426,213, filed on Nov. 17, 2022.

(51) Int. Cl.
 *G06F 9/451* (2018.01)
 *H04L 67/50* (2022.01)

(52) U.S. Cl.
 CPC ............ *G06F 9/451* (2018.02); *H04L 67/535* (2022.05)

(58) Field of Classification Search
 CPC ................................ G06F 9/451; H04L 67/535
 See application file for complete search history.

(56) References Cited

U.S. PATENT DOCUMENTS

| | | | | |
|---|---|---|---|---|
| 6,807,570 | B1 * | 10/2004 | Allen | G06F 16/9574 709/219 |
| 12,299,061 | B1 * | 5/2025 | Sharma | G06F 16/24552 |
| 2005/0144221 | A1 * | 6/2005 | Shin | G06F 16/957 707/E17.119 |
| 2015/0375113 | A1 * | 12/2015 | Justice | G06F 9/5027 463/42 |
| 2017/0087464 | A1 * | 3/2017 | Perry | A63F 13/352 |
| 2020/0145385 | A1 * | 5/2020 | Chauhan | H04L 63/0281 |
| 2021/0081466 | A1 * | 3/2021 | Su | G06F 16/9574 |
| 2023/0063608 | A1 * | 3/2023 | Zhuo | G06V 10/74 |
| 2023/0135295 | A1 * | 5/2023 | Cha | G06F 3/04817 719/329 |

\* cited by examiner

*Primary Examiner* — Daniel W Parcher
(74) *Attorney, Agent, or Firm* — GREENBLUM & BERNSTEIN, P.L.C.

(57) ABSTRACT

Various methods, apparatuses/systems, and media for automatically determining screen interaction readiness times of an application are disclosed. A processor establishes a communication link between an application embedded within a computing device and a server via a communication interface; receives user input from the user on a login screen of the application to launch the application; runs, in a background of the application, a plurality of screens in response to receiving the user input to launch the application; implements, in response to running, a preconfigured ML/AI algorithm; applies the ML/AI algorithm to a plurality of signals associated with interaction ready state of corresponding screen of the plurality screens; processes the plurality of signals based on the applied ML/AI algorithm; and automatically determines interaction ready state of each screen of the plurality of screens based on the processed plurality of signals prior to launching the application.

20 Claims, 5 Drawing Sheets

SYSTEM AND METHOD FOR AUTOMATICALLY MONITORING APPLICATION PERFORMANCE

CROSS-REFERENCE TO RELATED APPLICATIONS

This application claims the benefit of priority from U.S. Provisional Patent Application No. 63/426,213, filed Nov. 17, 2022, which is herein incorporated by reference in its entirety.

TECHNICAL FIELD

This disclosure generally relates to data processing, and, more particularly, to methods and apparatuses for implementing a language and platform agnostic automated application performance monitoring module for determining screen interaction readiness times associated with applications (i.e., mobile applications) automatically and accurately.

BACKGROUND

Today, a wide variety of business functions are commonly supported by software applications and tools, i.e., business intelligence (BI) tools. For instance, software application has been directed to performance analysis, project tracking, and competitive analysis, to name but a few. In general, across the multiple lines of businesses (LOB) at an organization, application developers are constantly faced with a daunting task of developing new applications for improving customer experience as well as productivity. For example, an application (i.e., a mobile application) may contain hundreds of screens and each screen may require multiple operations including but not limited to loading UI, images, fetching content, user data from a remote server and applying business logic to become "business interaction ready". Business interaction ready is the state when a user can start interacting with the screen like providing username and password on a login screen.

However, conventional tools lack the capabilities or configurations to automatically find out the time required for an application (i.e., a mobile application) screen to be business interaction ready as well identify which operations contributed towards the ready state without adding manual custom logs or code markers in all the screens. This may not be a scalable solution because developers have to maintain these code markers and also keep adding code markers for any new screen made. Moreover, these manually added code markers may not accurately predict the actual time taken by customer's phone to execute the code to actually make the screen interaction ready on customer's phone. It may prove to be extremely difficult to find out the actual time because such applications are used on hundreds of different types of phones or computing devices and each one has different hardware capabilities.

SUMMARY

The present disclosure, through one or more of its various aspects, embodiments, and/or specific features or sub-components, provides, among other features, various systems, servers, devices, methods, media, programs, and platforms for implementing a language and platform agnostic automated application performance monitoring module for determining screen interaction readiness times (i.e., the time required for the screen to be ready to be interacted by a user) associated with applications (i.e., mobile applications) automatically and accurately, but the disclosure is not limited thereto. For example, the present disclosure, through one or more of its various aspects, embodiments, and/or specific features or sub-components, also provides, among other features, various systems, servers, devices, methods, media, programs, and platforms for implementing the language and platform agnostic automated application performance monitoring module to automatically determine the time required for an application (i.e., a mobile application) screen to be business interaction ready as well identify which operations contributed towards the ready state without adding manual custom logs/markers in all the screens within an application, but the disclosure is not limited thereto. For example, the language and platform agnostic automated application performance monitoring module may be configured to predict the time based on pixel rendering on a user's device (i.e., a customer's mobile phone) and the user's actual interaction readiness times.

According to an aspect of the present disclosure, a method for automatically determining screen interaction readiness times of an application by utilizing one or more processors along with allocated memory is disclosed. The method may include: establishing a communication link between an application embedded within a computing device utilized by a user and a server via a communication interface; receiving user input from the user on a login screen of the application to launch the application; running, in a background of the application, a plurality of screens in response to receiving the user input to launch the application; implementing, in response to running, a preconfigured machine learning or artificial intelligence (ML/AI) algorithm; applying the ML/AI algorithm to a plurality of signals associated with interaction ready state of corresponding screen of the plurality screens; processing the plurality of signals based on the applied ML/AI algorithm; and automatically determining interaction ready state of each screen of the plurality of screens based on the processed plurality of signals prior to launching the application.

According to another aspect of the present disclosure, exemplary ML/AI algorithm may include logistic regression, naïve bayes algorithm, k-nearest neighbors (KNN) algorithm, etc., but the disclosure is not limited thereto.

According to a further aspect of the present disclosure, in receiving the user input, the method may further include: receiving a username and a password on the login screen of the application; and authorizing access to the application based on verifying the username and the password against prestored username and password associated with the user from the server.

According to another aspect of the present disclosure, in automatically determining the screen interaction time, the method may further include: receiving real time or near real time data associated with pixel rendering on the user's computing device and the user's actual interactions times; receiving hardware and/or network configuration data of the computing device from the server; and automatically determining the screen interaction time based on the received real time or near real time data and the received hardware and/or network configuration data.

According to yet another aspect of the present disclosure, the network configuration data may include real time or near real time network bandwidth of an internet service running in the computing device.

According to an aspect of the present disclosure, the plurality of signals may include one or more of the following signals: user interface lifecycle events associated with the application; pixel rendering states rendered on the computing device; various network calls and their state associated with the application; user's interactions with touch screen of the application; and common business logic associated with the application, but the disclosure is not limited thereto.

According to a further aspect of the present disclosure, the signals may be generic and may not be specific to a particular screen among the plurality of screens thereby not requiring specific coding for each screen and the signals are received in real time or near real time.

According to another aspect of the present disclosure, the computing device is a mobile device, i.e., a smart phone or tablet, but the disclosure is not limited thereto.

According to an aspect of the present disclosure, the method may further include automatically launching the application in response to the determined interaction ready state of each screen.

According to a further aspect of the present disclosure, the method may further include: determining whether other applications, in addition to the application to be launched, are running on the computing device; and automatically determining the screen interaction time of the application to be launched based on determining screen interaction readiness times associated with the other applications that are running on the computing device.

According to an aspect of the present disclosure, a system for automatically determining screen interaction readiness times of an application is disclosed. The system may include a processor; and a memory operatively connected to the processor via a communication interface, the memory storing computer readable instructions, when executed, may cause the processor to: establish a communication link between an application embedded within a computing device utilized by a user and a server via a communication interface; receive user input from the user on a login screen of the application to launch the application; run, in a background of the application, a plurality of screens in response to receiving the user input to launch the application; implement, in response to running, a preconfigured ML/AI algorithm; apply the ML/AI algorithm to a plurality of signals associated with interaction ready state of corresponding screen of the plurality screens; process the plurality of signals based on the applied ML/AI algorithm; and automatically determine interaction ready state of each screen of the plurality of screens based on the processed plurality of signals prior to launching the application.

According to a further aspect of the present disclosure, in receiving the user input, the processor may be further configured to: receive a username and a password on the login screen of the application; and authorize access to the application based on verifying the username and the password against prestored username and password associated with the user from the server.

According to another aspect of the present disclosure, in automatically determining the screen interaction time, the processor may be further configured to: receive real time or near real time data associated with pixel rendering on the user's computing device and the user's actual interactions times; receive hardware and/or network configuration data of the computing device from the server; and automatically determine the screen interaction time based on the received real time or near real time data and the received hardware and/or network configuration data.

According to yet another aspect of the present disclosure, the processor may be further configured to: automatically launch the application in response to the determined interaction ready state of each screen.

According to a further aspect of the present disclosure, the processor may be further configured to: determine whether other applications, in addition to the application to be launched, are running on the computing device; and automatically determine the screen interaction time of the application to be launched based on determining screen interaction readiness times associated with the other applications that are running on the computing device.

According to an aspect of the present disclosure, a non-transitory computer readable medium configured to store instructions for automatically determining screen interaction readiness times of an application is disclosed. The instructions, when executed, may cause a processor to perform the following: establishing a communication link between an application embedded within a computing device utilized by a user and a server via a communication interface; receiving user input from the user on a login screen of the application to launch the application; running, in a background of the application, a plurality of screens in response to receiving the user input to launch the application; implementing, in response to running, a preconfigured ML/AI algorithm; applying the ML/AI algorithm to a plurality of signals associated with interaction ready state of corresponding screen of the plurality screens; processing the plurality of signals based on the applied ML/AI algorithm; and automatically determining interaction ready state of each screen of the plurality of screens based on the processed plurality of signals prior to launching the application.

According to a further aspect of the present disclosure, in receiving the user input, the instructions, when executed, may cause the processor to further perform the following: receiving a username and a password on the login screen of the application; and authorizing access to the application based on verifying the username and the password against prestored username and password associated with the user from the server.

According to another aspect of the present disclosure, in automatically determining the screen interaction time, the instructions, when executed, may cause the processor to further perform the following: receiving real time or near real time data associated with pixel rendering on the user's computing device and the user's actual interactions times; receiving hardware and/or network configuration data of the computing device from the server; and automatically determining the screen interaction time based on the received real time or near real time data and the received hardware and/or network configuration data.

According to yet another aspect of the present disclosure, the instructions, when executed, may cause the processor to further perform the following: automatically launching the application in response to the determined interaction ready state of each screen.

According to an aspect of the present disclosure, the instructions, when executed, may cause the processor to further perform the following: determining whether other applications, in addition to the application to be launched, are running on the computing device; and automatically determining the screen interaction time of the application to be launched based on determining screen interaction readiness times associated with the other applications that are running on the computing device.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
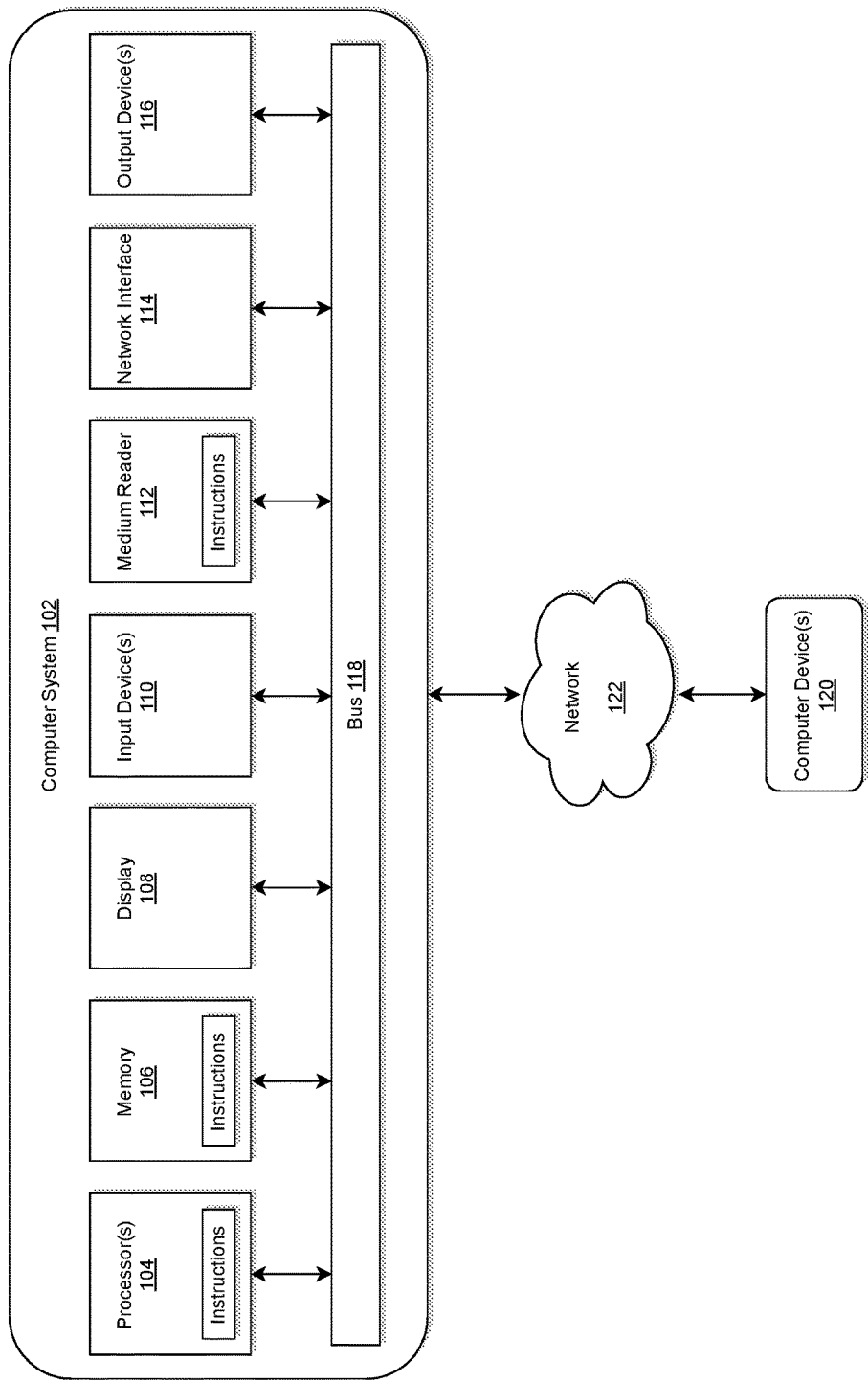
FIG. 1 illustrates a computer system for implementing a language and platform agnostic automated application performance monitoring module that may be configured for determining screen interaction readiness times associated with applications (i.e., mobile applications) automatically and accurately in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing an automated application performance monitoring module that may be configured for determining screen interaction readiness times associated with applications (i.e., mobile applications) automatically and accurately in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, BLUETOOTH®, ZIGBEE®, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the automated application performance monitoring module may be platform and language agnostic that may allow for consistent easy orchestration and passing of data through various components to output a desired result regardless of language, platform or cloud environment. Since the disclosed process, according to exemplary embodiments, is language and platform agnostic, the automated application performance monitoring module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
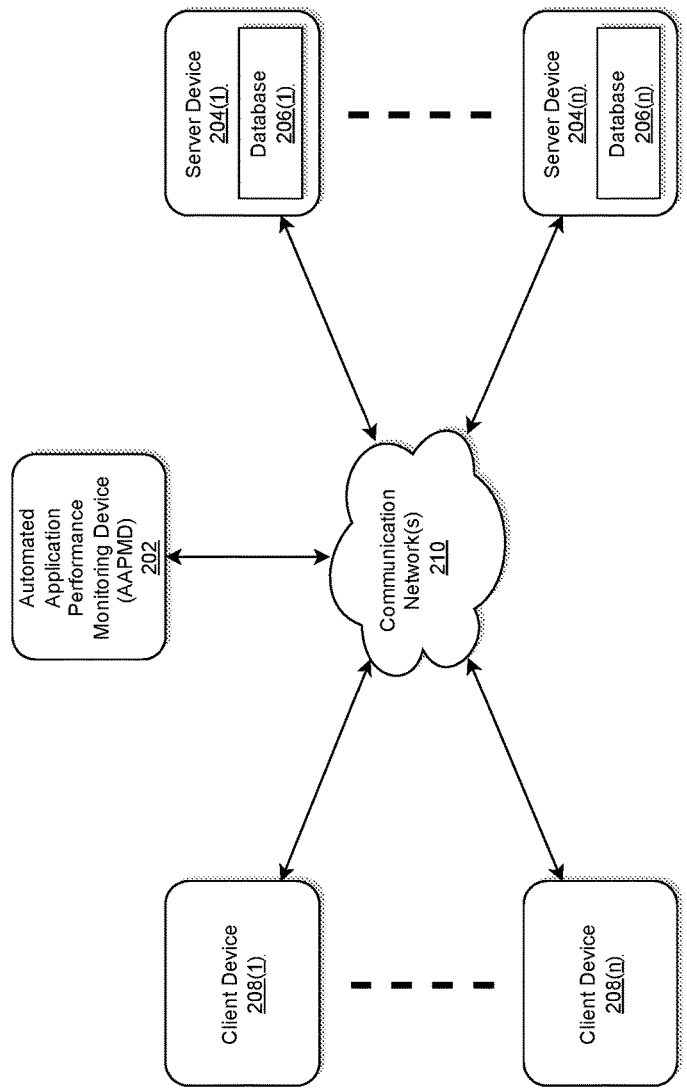
FIG. 2 illustrates an exemplary diagram of a network environment with a language and platform agnostic automated application performance device in accordance with an exemplary embodiment.

Referring to FIG. 2, a schematic of an exemplary network environment 200 for implementing a language and platform agnostic automated application performance monitoring device (AAPMD) of the instant disclosure is illustrated.

According to exemplary embodiments, the above-described problems associated with conventional tools may be overcome by implementing an AAPMD 202 as illustrated in FIG. 2 that may be configured for implementing an automated application performance monitoring module for determining screen interaction readiness times associated with applications (i.e., mobile applications) automatically and accurately, but the disclosure is not limited thereto. For example, according to exemplary embodiments, the above-described problems associated with conventional tools may be overcome by implementing an AAPMD 202 as illustrated in FIG. 2 that may be configured for implementing an automated application performance monitoring module to automatically determine the time required for an application (i.e., a mobile application) screen to be business interaction ready as well identify which operations contributed towards the ready state without adding manual custom logs/markers in all the screens within an application, but the disclosure is not limited thereto.

The AAPMD 202 may be the same or similar to the computer system 102 as described with respect to FIG. 1.

The AAPMD 202 may store one or more applications that can include executable instructions that, when executed by the AAPMD 202, cause the AAPMD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AAPMD 202 itself, may be located in virtual server(s) running in a cloud-based computing environment rather than being tied to one or more specific physical network computing devices. Also, the application(s) may be running in one or more virtual machines (VMs) executing on the AAPMD 202.

Additionally, in one or more embodiments of this technology, virtual machine(s) running on the AAPMD 202 may be managed or supervised by a hypervisor.

In the network environment 200 of FIG. 2, the AAPMD 202 is coupled to a plurality of server devices 204(1)-204(n) that hosts a plurality of databases 206(1)-206(n), and also to a plurality of client devices 208(1)-208(n) via communication network(s) 210. A communication interface of the AAPMD 202, such as the network interface 114 of the computer system 102 of FIG. 1, operatively couples and communicates between the AAPMD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AAPMD 202, the server devices 204(1)-204 (n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The AAPMD 202 may be a standalone device or integrated with one or more other devices or apparatuses, such as one or more of the server devices 204(1)-204(n), for example. In one particular example, the AAPMD 202 may be hosted by one of the server devices 204(1)-204(n), and other arrangements are also possible. Moreover, one or more of the devices of the AAPMD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the AAPMD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206 (n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the AAPMD 202 that may efficiently provide a platform for implementing an automated application performance monitoring module for determining screen interaction readiness times associated with applications (i.e., mobile applications) automatically and accurately, but the disclosure is not limited thereto. For example, according to exemplary embodiments, the client devices 208(1)-208(n) in this example may include any type of computing device that can facilitate the implementation of the AAPMD 202 that may efficiently provide a platform for implementing an automated application performance monitoring module to automatically determine the time required for an application (i.e., a mobile application) screen to be business interaction ready as well identify which operations contributed towards the ready state without adding manual custom logs/markers in all the screens within an application, but the disclosure is not limited thereto.

The client devices 208(1)-208(n) may run interface applications, such as standard web browsers or standalone client applications, which may provide an interface to communicate with the AAPMD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the AAPMD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the AAPMD 202, the server devices 204(1)-204(n), or the client devices 208(1)-208(n), for example, may be configured to operate as virtual instances on the same physical machine. For example, one or more of the AAPMD 202, the server devices 204(1)-204(n), or the client devices 208(1)-208(n) may operate on the same physical device rather than as separate devices communicating through communication network(s) 210. Additionally, there may be more or fewer AAPMDs 202, server devices 204(1)-204(n), or client devices 208(1)-208(n) than illustrated in FIG. 2. According to exemplary embodiments, the AAPMD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
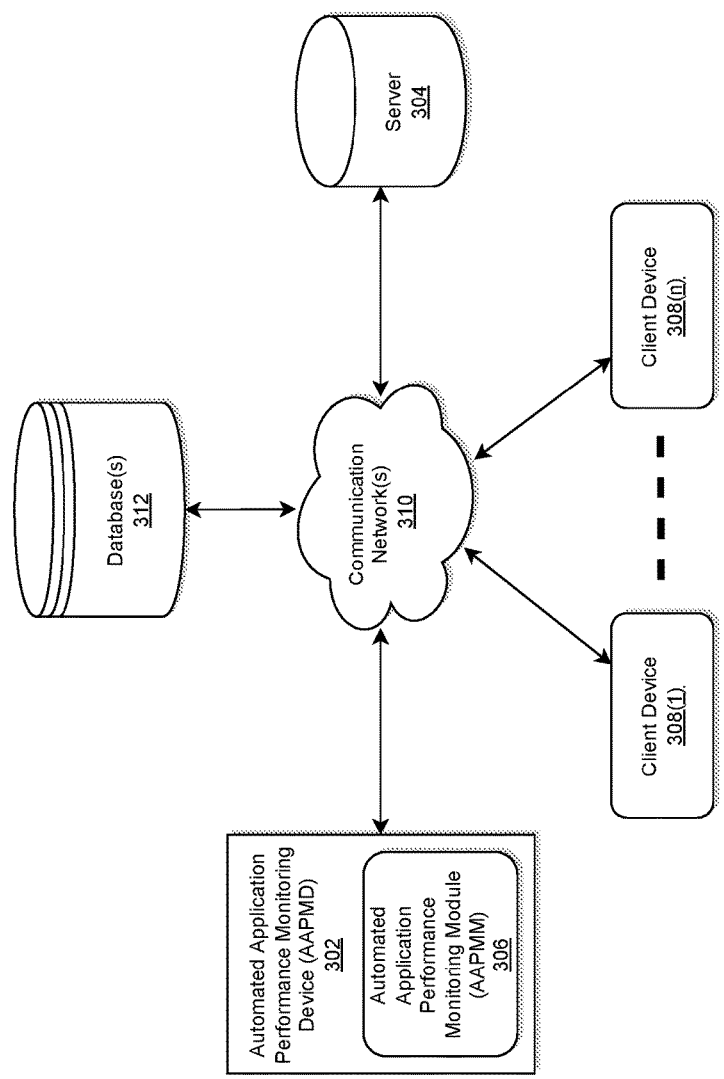
FIG. 3 illustrates a system diagram for implementing a language and platform agnostic automated application performance device having a language and platform agnostic automated application performance monitoring module in accordance with an exemplary embodiment.

FIG. 3 illustrates a system diagram for implementing an AAPMD having an automated application performance monitoring module (AAPMM) in accordance with an exemplary embodiment.

As illustrated in FIG. 3, the system 300 may include a AAPMD 302 within which an AAPMM 306 is embedded, a server 304, a database(s) 312, a plurality of client devices 308(1) . . . 308(n), and a communication network 310.

According to exemplary embodiments, the AAPMD 302 including the AAPMM 306 may be connected to the server 304, and the database(s) 312 via the communication network 310. The AAPMD 302 may also be connected to the plurality of client devices 308(1) . . . 308(n) via the communication network 310, but the disclosure is not limited thereto.

According to exemplary embodiment, the AAPMD 302 is described and shown in FIG. 3 as including the AAPMM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the AAPMM 306 may be configured to receive real-time or near real-time feed of data from the plurality of client devices 308(1) . . . 308(n) via the communication network 310.

As may be described below, the AAPMM 306 may be configured to: establish a communication link between an application embedded within a computing device utilized by a user and a server via a communication interface; receive user input from the user on a login screen of the application to launch the application; run, in a background of the application, a plurality of screens in response to receiving the user input to launch the application; implement, in response to running, a preconfigured machine learning or artificial intelligence (ML/AI) algorithm; apply the ML/AI algorithm to a plurality of signals associated with interaction ready state of corresponding screen of the plurality screens; process the plurality of signals based on the applied ML/AI algorithm; and automatically determine interaction ready state of each screen of the plurality of screens based on the processed plurality of signals prior to launching the application, but the disclosure is not limited thereto.

The plurality of client devices 308(1) . . . 308(n) are illustrated as being in communication with the AAPMD 302. In this regard, the plurality of client devices 308(1) . . . 308(n) may be "clients" (e.g., customers) of the AAPMD 302 and are described herein as such. Nevertheless, it is to be known and understood that the plurality of client devices 308(1) . . . 308(n) need not necessarily be "clients" of the AAPMD 302, or any entity described in association therewith herein. Any additional or alternative relationship may exist between either or both of the plurality of client devices 308(1) . . . 308(n) and the AAPMD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the AAPMD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The AAPMD 302 may be the same or similar to the AAPMD 202 as described with respect to FIG. 2, including any features or combination of features described with respect thereto.

Figure 4:
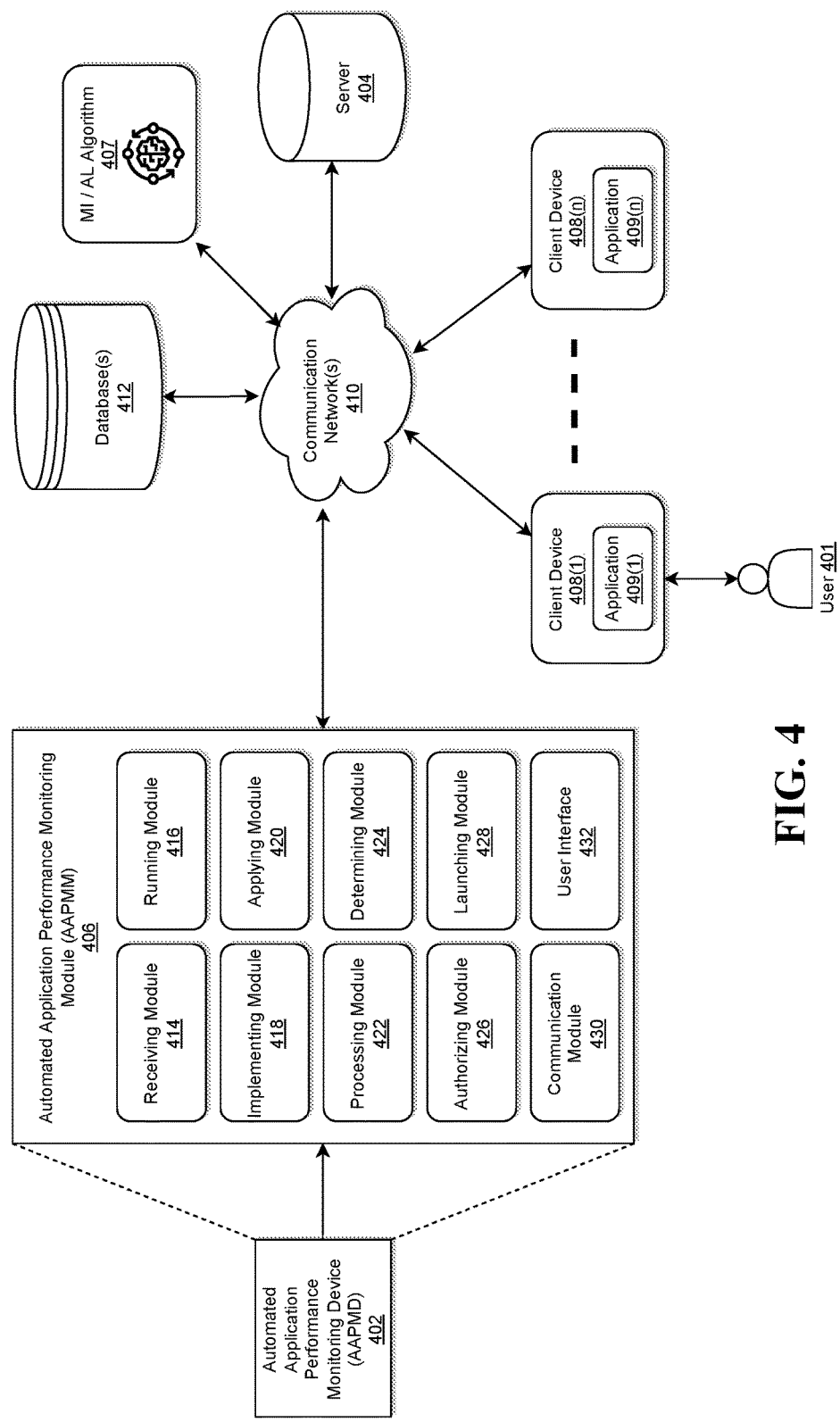
FIG. 4 illustrates a system diagram for implementing a language and platform agnostic automated application performance monitoring module of FIG. 3 in accordance with an exemplary embodiment.

FIG. 4 illustrates a system diagram for implementing an AAPMM of FIG. 3 in accordance with an exemplary embodiment.

According to exemplary embodiments, the system 400 may include a language and platform agnostic AAPMD 402 within which a language and platform agnostic AAPMM 406 is embedded, a server 404, database(s) 412, and a communication network 410.

According to exemplary embodiments, the AAPMD 402 including the AAPMM 406 may be connected to the server 404 and the database(s) 412 via the communication network 410. The AAPMD 402 may also be connected to the plurality of client devices 408(1)-408(n) via the communication network 410, but the disclosure is not limited thereto. The AAPMM 406, the server 404, the plurality of client devices 408(1)-408(n), the database(s) 412, the communication network 410 as illustrated in FIG. 4 may be the same or similar to the AAPMM 306, the server 304, the plurality of client devices 308(1)-308(n), the database(s) 312, the communication network 310, respectively, as illustrated in FIG. 3.

According to exemplary embodiments, one or applications 409 may be embedded within the each of the client devices 408(1)-408(n).

According to exemplary embodiments, as illustrated in FIG. 4, the AAPMM 406 may include a receiving module 414, a running module 416, an implementing module 418, an applying module 420, a processing module 422, a determining module 424, an authorizing module 426, a launching module 428, a communication module 430, and a user interface 432. According to exemplary embodiments, interactions and data exchange among these modules included in the AAPMM 406 provide the advantageous effects of the disclosed invention. Functionalities of each module of FIG. 4 may be described in detail below with reference to FIGS. 4-5.

According to exemplary embodiments, each of the receiving module 414, running module 416, implementing module 418, applying module 420, processing module 422, determining module 424, authorizing module 426, launching module 428, and the communication module 430 of the AAPMM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, running module 416, implementing module 418, applying module 420, processing module 422, determining module 424, authorizing module 426, launching module 428, and the communication module 430 of the AAPMM 406 of FIG. 4 may be programmed using software (e.g., microcode) to perform various functions discussed herein and may optionally be driven by firmware and/or software.

Alternatively, according to exemplary embodiments, each of the receiving module 414, running module 416, implementing module 418, applying module 420, processing module 422, determining module 424, authorizing module 426, launching module 428, and the communication module 430 of the AAPMM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, running module 416, implementing module 418, applying module 420, processing module 422, determining module 424, authorizing module 426, launching module 428, and the communication module 430 of the AAPMM 406 of FIG. 4 may be called via corresponding API.

According to exemplary embodiments, the process may be executed via the communication module 430 and the communication network 410, which may comprise plural networks as described above. For example, in an exemplary embodiment, the various components of the AAPMM 406 may communicate with the server 404, and the database(s) 412 via the communication module 430 and the communication network 410. Of course, these embodiments are merely exemplary and are not limiting or exhaustive.

According to exemplary embodiments, the communication module 430 may be configured to establish a communication link between an application 409 embedded within the computing device 408 utilized by a user 401 and a server 404.

According to exemplary embodiments, the receiving module 414 may be configured to receive user input, via the user interface 432 from the user 401 on a login screen of the application 409 to launch the application 409. According to exemplary embodiments, in receiving the user input, the receiving module 414 may be configured to receive a username and a password on the login screen of the application 409 and the authorizing module 426 may be configured to authorize access to the application 409 based on verifying the username and the password against prestored username and password associated with the user 401 from the server 404.

According to exemplary embodiments, the running module 416 may be configured to run, in a background of the application 409, a plurality of screens in response to receiving the user input to launch the application 409.

According to exemplary embodiments, the implementing module 418 may be configured to implement, in response to running, a preconfigured ML/AI algorithm 407. The applying module 420 may be configured to apply the ML/AI algorithm 407 to a plurality of signals associated with interaction ready state of corresponding screen of the plurality screens.

According to exemplary embodiments, the preconfigured ML/AI algorithm 407 may receive various input data and process these input data by utilizing a trained model to output information, i.e., interaction ready state of each screen of the plurality of screens based on the processed input data.

For example, the preconfigured ML/AI algorithm 407 may receive various input data corresponding to one or more of the following data: device (on which the application 409 is running) hardware specifications, i.e., processor, number of cores, RAM, display size, screen density, display refresh rate, Wi-Fi specifications, network processor specification, etc.; what other applications are running on that device, i.e., camera, ongoing phone call, messaging, etc.; security aspect of that device, i.e., malware, rooted device or not; network aspect of that device at the time of running the application, i.e., whether it is connected to a Wi-Fi and connection speed of the Wi-Fi?, whether it is connected to 3G, 4G or 5G, operator name, current location, etc.; device accessibility options at the time of running the application, i.e., screen reader enabled, screen density selection, text size selection, etc.; network congestion of that time when the application was running; user's account situation, i.e., how many accounts user has with a particular institution, age of those accounts, if intercepts waiting for those accounts etc.; time taken for user to interact with the screen, i.e., scrolling, button click, etc., but the disclosure is not limited thereto.

According to exemplary embodiments, the preconfigured ML/AI algorithm 407 may process these input data and utilizes a trained model to output information, i.e., interaction ready state of each screen of the plurality of screens based on the processed input data. For example, the output information may correspond to, from the perspective of performance, what should be the target custom interaction ready time of that screen and what is achieved. Each screen may have slightly different target interaction ready time and actual interaction ready time.

According to exemplary embodiments, ML/AI algorithm may include logistic regression, naïve bayes algorithm, KNN algorithm, etc., but the disclosure is not limited thereto.

The logistic regression is a process of modeling the probability of a discrete outcome given the input data. According to exemplary embodiments, the logistic regression algorithm may model a binary outcome, i.e., something that can take two values such as true/false, yes/no, and so on.

The naïve bayes algorithm is a classification technique based on Bayes' Theorem with an independence assumption among predictors. For example, a naïve bayes classifier assumes that the presence of a particular feature in a class is unrelated to the presence of any other feature.

The KNN algorithm, is a non-parametric, supervised learning classifier, which uses proximity to make classifications or predictions about the grouping of an individual data point.

According to exemplary embodiments, the plurality of signals may include one or more of the following signals: user interface lifecycle events associated with the application 409; pixel rendering states rendered on the computing device 408; various network calls and their state associated with the application 409; user's interactions with touch screen of the application 409; and common business logic associated with the application 409, but the disclosure is not limited thereto.

According to exemplary embodiments, the signals may be generic and may not be specific to a particular screen among the plurality of screens thereby not requiring specific coding for each screen and the signals are received in real time or near real time.

According to exemplary embodiments, the processing module 422 may be configured to process the plurality of signals based on the applied ML/AI algorithm 407; and the determining module 424 may be configured to automatically determine interaction ready state of each screen of the plurality of screens based on the processed plurality of signals prior to launching the application 409.

According to exemplary embodiments, in automatically determining the screen interaction time, the receiving module 414 may be configured to receive real time or near real time data associated with pixel rendering on the user's computing device 408 and the user's actual interactions times; receive hardware and/or network configuration data of the computing device 408 from the server 404. The determining module 424 may be configured to automatically determine the screen interaction time based on the received real time or near real time data and the received hardware and/or network configuration data.

According to exemplary embodiments, the network configuration data may include real time or near real time network bandwidth of an internet service running in the computing device 408.

According to exemplary embodiments, the computing device 408 may be a mobile device, i.e., a smart phone or tablet, but the disclosure is not limited thereto.

According to exemplary embodiments, the launching module 428 may be configured to automatically launch the application 409 in response to the determined interaction ready state of each screen.

According to exemplary embodiments, the determining module 424 may be configured to determine whether other applications, in addition to the application 409 to be launched, are running on the computing device 408; and automatically determine the screen interaction time of the application 409 to be launched based on determining screen interaction readiness times associated with the other applications that are running on the computing device 408.

Figure 5:
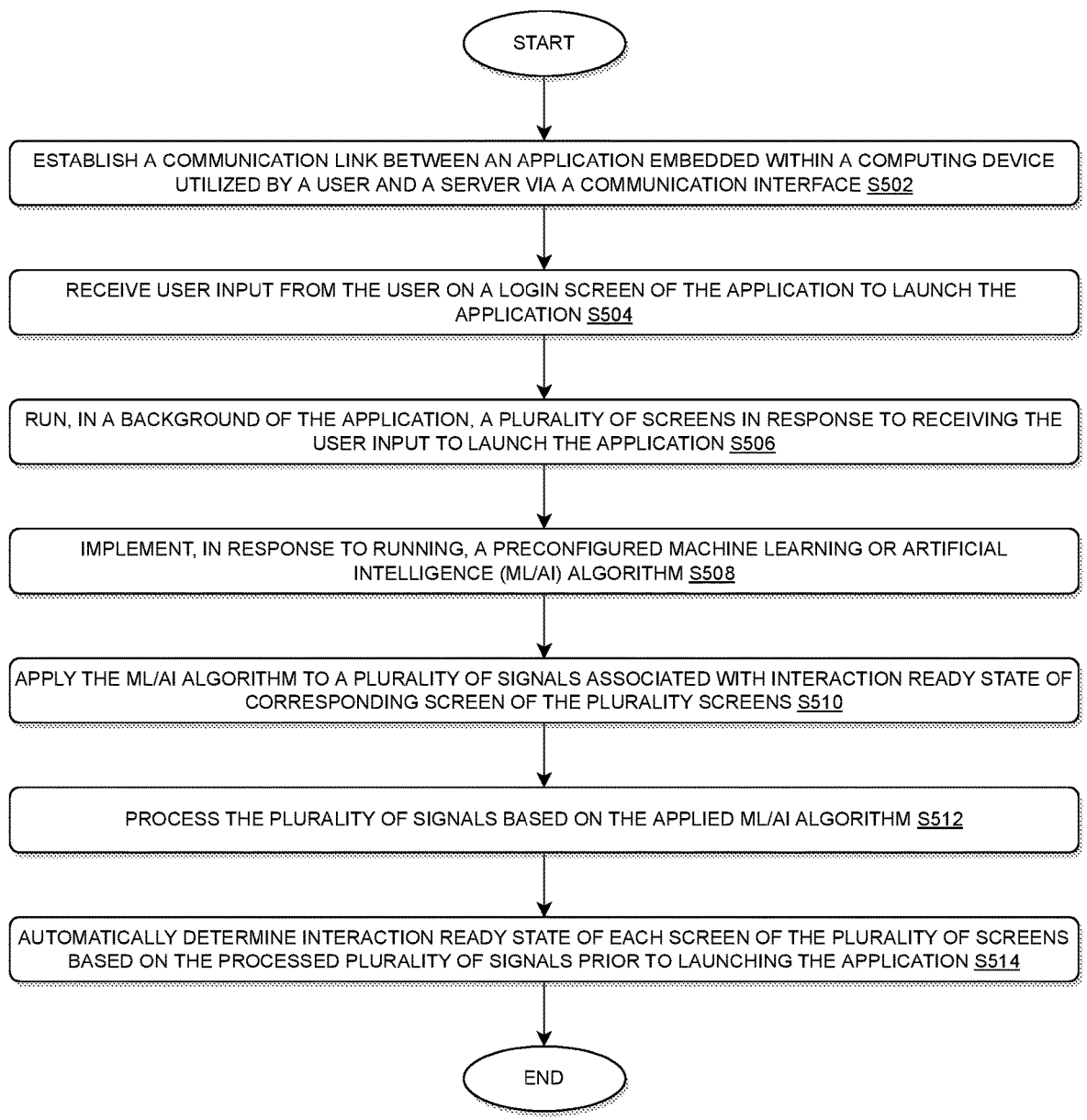
FIG. 5 illustrates an exemplary flow chart implemented by the language and platform agnostic automated application performance monitoring module of FIG. 4 for determining screen interaction readiness times associated with applications (i.e., mobile applications) automatically and accurately in accordance with an exemplary embodiment.

FIG. 5 illustrates an exemplary flow chart of a process 500 implemented by the AAPMM 406 of FIG. 4 for automatically determining screen interaction readiness times of an application in accordance with an exemplary embodiment. It may be appreciated that the illustrated process 500 and associated steps may be performed in a different order, with illustrated steps omitted, with additional steps added, or with a combination of reordered, combined, omitted, or additional steps.

As illustrated in FIG. 5, at step S502, the process 500 may include establishing a communication link between an application embedded within a computing device utilized by a user and a server via a communication interface.

At step S504, the process 500 may include receiving user input from the user on a login screen of the application to launch the application.

At step S506, the process 500 may include running, in a background of the application, a plurality of screens in response to receiving the user input to launch the application.

At step S508, the process 500 may include implementing, in response to running, a preconfigured ML/AI algorithm.

At step S510, the process 500 may include applying the ML/AI algorithm to a plurality of signals associated with interaction ready state of corresponding screen of the plurality screens.

At step S512, the process 500 may include processing the plurality of signals based on the applied ML/AI algorithm.

At step S514, the process 500 may include automatically determining interaction ready state of each screen of the plurality of screens based on the processed plurality of signals prior to launching the application.

Moreover, according to exemplary embodiments, the process 500 as illustrated in FIG. 5 may further include automatically determining interaction ready state of each screen of the plurality of screens so that the right performance number for that computing device and signal combination can be calculated.

According to exemplary embodiments, in receiving the user input, the process 500 may further include: receiving a username and a password on the login screen of the application; and authorizing access to the application based on verifying the username and the password against prestored username and password associated with the user from the server.

According to exemplary embodiments, in automatically determining the screen interaction time, the process 500 may further include: receiving real time or near real time data associated with pixel rendering on the user's computing device and the user's actual interactions times; receiving hardware and/or network configuration data of the computing device from the server; and automatically determining the screen interaction time based on the received real time or near real time data and the received hardware and/or network configuration data.

According to exemplary embodiments, the process 500 may further include automatically launching the application in response to the determined interaction ready state of each screen.

According to exemplary embodiments, the process 500 may further include: determining whether other applications, different from the application to be launched, are running on the computing device; and automatically determining the screen interaction time of the application to be launched based on determining screen interaction readiness times associated with the other applications that are running on the computing device.

According to exemplary embodiments, the AAPMD 402 may include a memory (e.g., a memory 106 as illustrated in FIG. 1) which may be a non-transitory computer readable medium that may be configured to store instructions for implementing an AAPMM 406 for automatically determining screen interaction readiness times of an application as disclosed herein. The AAPMD 402 may also include a medium reader (e.g., a medium reader 112 as illustrated in FIG. 1) which may be configured to read any one or more sets of instructions, e.g., software, from any of the memories described herein. The instructions, when executed by a processor embedded within the AAPMM 406 or within the AAPMD 402, may be used to perform one or more of the methods and processes as described herein. In a particular embodiment, the instructions may reside completely, or at least partially, within the memory 106, the medium reader 112, and/or the processor 104 (see FIG. 1) during execution by the AAPMD 402.

According to exemplary embodiments, the instructions, when executed, may cause a processor embedded within the AAPMM 406 or the AAPMD 402 to perform the following: establishing a communication link between an application embedded within a computing device utilized by a user and a server via a communication interface; receiving user input from the user on a login screen of the application to launch the application; running, in a background of the application, a plurality of screens in response to receiving the user input to launch the application; implementing, in response to running, a preconfigured machine learning or artificial intelligence (ML/AI) algorithm; applying the ML/AI algorithm to a plurality of signals associated with interaction ready state of corresponding screen of the plurality screens; processing the plurality of signals based on the applied ML/AI algorithm; and automatically determining interaction ready state of each screen of the plurality of screens based on the processed plurality of signals prior to launching the application. According to exemplary embodiments, the processor may be the same or similar to the processor 104 as illustrated in FIG. 1 or the processor embedded within AAPMD 202, AAPMD 302, AAPMD 402, and AAPMM 406.

According to exemplary embodiments, in receiving the user input, the instructions, when executed, may cause the processor 104 to further perform the following: receiving a username and a password on the login screen of the application; and authorizing access to the application based on verifying the username and the password against prestored username and password associated with the user from the server.

According to exemplary embodiments, in automatically determining the screen interaction time, the instructions, when executed, may cause the processor 104 to further perform the following: receiving real time or near real time data associated with pixel rendering on the user's computing device and the user's actual interactions times; receiving hardware and/or network configuration data of the computing device from the server; and automatically determining the screen interaction time based on the received real time or near real time data and the received hardware and/or network configuration data.

According to exemplary embodiments, the instructions, when executed, may cause the processor 104 to further perform the following: automatically launching the application in response to the determined interaction ready state of each screen.

According to exemplary embodiments, the instructions, when executed, may cause the processor 104 to further perform the following: determining whether other applications, different from the application to be launched, are running on the computing device; and automatically determining the screen interaction time of the application to be launched based on determining screen interaction readiness times associated with the other applications that are running on the computing device.

According to exemplary embodiments as disclosed above in FIGS. 1-5, technical improvements effected by the instant disclosure may include a platform for implementing an automated application performance monitoring module for determining screen interaction readiness times associated with applications (i.e., mobile applications) automatically and accurately, but the disclosure is not limited thereto. For example, according to exemplary embodiments as disclosed above in FIGS. 1-5, technical improvements effected by the instant disclosure may include a platform for implementing an automated application performance monitoring module to automatically determine the time required for an application (i.e., a mobile application) screen to be business interaction ready as well identify which operations contributed towards the ready state without adding manual custom logs/markers in all the screens within an application, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically determining screen interaction readiness times of an application by utilizing one or more processors along with allocated memory, the method comprising:
   establishing a communication link between an application embedded within a computing device utilized by a user and a server via a communication interface;
   receiving user input from the user on a login screen of the application to launch the application, wherein launching the application in response to the received user input comprises:
      running, in a background of the application, a plurality of screens of the application;
      implementing, in response to running, a preconfigured machine learning or artificial intelligence (ML/AI) algorithm;
      applying the ML/AI algorithm to a plurality of signals associated with interaction ready state of corresponding screen of the plurality of screens, wherein the plurality of signals include one or more of the following signals: user interface lifecycle events associated with the application; pixel rendering states rendered on the computing device; network calls and their state associated with the application; user's interactions with touch screen of the application; and business logic associated with the application;
      processing the plurality of signals based on the applied ML/AI algorithm;
      automatically determining interaction ready state of each screen of the plurality of screens based on the processed plurality of signals prior to launching the application; and
      automatically launching the application in response to the determined interaction ready state of each screen.

2. The method according to claim 1, wherein in receiving the user input, the method further comprising: receiving a username and a password on the login screen of the application; and authorizing access to the application based on verifying the username and the password against prestored username and password associated with the user from the server.

3. The method according to claim 1, wherein in automatically determining the screen interaction time, the method further comprising: receiving realtime data associated with pixel rendering on the user's computing device and the user's actual interactions times; receiving hardware and/or network configuration data of the computing device from the server; and automatically determining the screen interaction time based on the received real time data and the received hardware and/or network configuration data.

4. The method according to claim 3, wherein the network configuration data includes real time network bandwidth of an internet service running in the computing device.

5. The method according to claim 1, wherein the signals are generic and not specific to a particular screen among the plurality of screens thereby not requiring specific coding for each screen and the signals are received in real time.

6. The method according to claim 1, wherein the computing device is a mobile device.

7. The method according to claim 1, wherein the mobile device is a smart phone.

8. The method according to claim 1, further comprising: determining whether other applications, in addition to the application to be launched, are running on the computing device; and automatically determining the screen interaction time of the application to be launched based on determining screen interaction readiness times associated with the other applications that are running on the computing device.

9. A system for automatically determining screen interaction readiness times of an application, the system comprising:
   a processor; and
   a memory operatively connected to the processor via a communication interface, the memory storing computer readable instructions, when executed, causes the processor to:
   establish a communication link between an application embedded within a computing device utilized by a user and a server via a communication interface;
   receive user input from the user on a login screen of the application to launch the application, wherein in launching the application in response to the received user input, the instructions, when executed, cause the processor to:
      run, in a background of the application, a plurality of screens of the application;
      implement, in response to running, a preconfigured machine learning or artificial intelligence (ML/AI) algorithm;
      apply the ML/AI algorithm to a plurality of signals associated with interaction ready state of corresponding screen of the plurality of screens, wherein the plurality of signals include one or more of the following signals: user interface lifecycle events associated with the application; pixel rendering states rendered on the computing device; network calls and their state associated with the application; user's interactions with touch screen of the application; and business logic associated with the application;
      process the plurality of signals based on the applied ML/AI algorithm;
      automatically determine interaction ready state of each screen of the plurality of screens based on the processed plurality of signals prior to launching the application; and
      automatically launch the application in response to the determined interaction ready state of each screen.

10. The system according to claim 9, in receiving the user input, the processor is further configured to: receive a username and a password on the login screen of the application; and authorize access to the application based on verifying the username and the password against prestored username and password associated with the user from the server.

11. The system according to claim 9, in automatically determining the screen interaction time, the processor is further configured to: receive real time data associated with pixel rendering on the user's computing device and the user's actual interactions times; receive hardware and/or network configuration data of the computing device from the server; and automatically determine the screen interaction time based on the received real time data and the received hardware and/or network configuration data.

12. The system according to claim 11, wherein the network configuration data includes real time network bandwidth of an internet service running in the computing device.

13. The system according to claim 9, wherein the signals are not specific to a particular screen among the plurality of screens thereby not requiring specific coding for each screen and the signals are received in real time.

14. The system according to claim 9, wherein the computing device is a mobile device.

15. The system according to claim 9, the processor is further configured to: determine whether other applications, in addition to the application to be launched, are running on the computing device; and automatically determine the screen interaction time of the application to be launched based on determining screen interaction readiness times associated with the other applications that are running on the computing device.

16. A non-transitory computer readable medium configured to store instructions for automatically determining screen interaction readiness times of an application, wherein, when executed, the instructions cause a processor to perform the following:
    establishing a communication link between an application embedded within a computing device utilized by a user and a server via a communication interface;
    receiving user input from the user on a login screen of the application to launch the application, wherein in launching the application in response to the received user input, the instructions, when executed, cause the processor to further perform the following:
        running, in a background of the application, a plurality of screens of the application;
        implementing, in response to running, a preconfigured machine learning or artificial intelligence (ML/AI) algorithm;
        applying the ML/AI algorithm to a plurality of signals associated with interaction ready state of corresponding screen of the plurality of screens, wherein the plurality of signals include one or more of the following signals: user interface lifecycle events associated with the application; pixel rendering states rendered on the computing device; network calls and their state associated with the application; user's interactions with touch screen of the application; and business logic associated with the application;
        processing the plurality of signals based on the applied ML/AI algorithm;
        automatically determining interaction ready state of each screen of the plurality of screens based on the processed plurality of signals prior to launching the application; and
        automatically launching the application in response to the determined interaction ready state of each screen.

17. The non-transitory computer readable medium according to claim 16, wherein in receiving the user input, the instructions, when executed, cause the processor to further perform the following: receiving a username and a password on the login screen of the application; and authorizing access to the application based on verifying the username and the password against prestored username and password associated with the user from the server.

18. The non-transitory computer readable medium according to claim 16, wherein in automatically determining the screen interaction time, the instructions, when executed, cause the processor to further perform the following: receiving real time data associated with pixel rendering on the user's computing device and the user's actual interactions times; receiving hardware and/or network configuration data of the computing device from the server; and automatically determining the screen interaction time based on the received real time data and the received hardware and/or network configuration data.

19. The non-transitory computer readable medium according to claim 18, wherein the network configuration data includes realtime network bandwidth of an internet service running in the computing device.

20. The non-transitory computer readable medium according to claim 16, wherein the signals are not specific to a particular screen among the plurality of screens thereby not requiring specific coding for each screen and the signals are received in realtime.

* * * * *